United States Patent [19]
Toohey

[11] 3,974,713
[45] Aug. 17, 1976

[54] MULTI-STROKE PARKING BRAKE CONTROL

[75] Inventor: Raymond F. Toohey, Lincoln Park, Mich.

[73] Assignee: Ford Motor Company, Dearborn, Mich.

[22] Filed: July 1, 1974

[21] Appl. No.: 484,894

[52] U.S. Cl. .............................. 74/512; 192/12 BA
[51] Int. Cl.² ......................................... G05G 1/14
[58] Field of Search .................. 74/125.5, 142, 512; 192/12 B, 12 BA; 242/54 R; 254/186 HC, 169

[56] References Cited
UNITED STATES PATENTS

| | | | |
|---|---|---|---|
| 2,026,350 | 12/1935 | Looschen | 192/12 B |
| 2,868,887 | 1/1959 | Greshel | 192/12 BA |

*Primary Examiner*—Samuel Scott
*Assistant Examiner*—Frank H. McKenzie, Jr.
*Attorney, Agent, or Firm*—Clifford L. Sadler; Keith L. Zerschling

[57] ABSTRACT

The present disclosure describes a multi-stroke parking brake control that includes a pulley connected to a parking brake cable and a brake pedal arranged to drive the pulley. The pulley has a large gear in mesh engagement with a driving pinion supported by the brake pedal and a holding pinion supported by the control housing. A one-way helical spring clutch drivingly interconnects the driving pinion and the pedal when the pedal is moved in a direction to tension the brake cable. A similar spring cable interconnects the holding pinion and the housing and functions to hold the gear and pulley in a brake applied condition. A release mechanism is arranged to release the second one-way helical spring clutch to permit the pulley and brake cable to move to a released position under the force of a release spring. This construction of a parking brake control permits the brake pedal to be stroked a plurality of times to tension the brake cable as desired.

1 Claim, 4 Drawing Figures

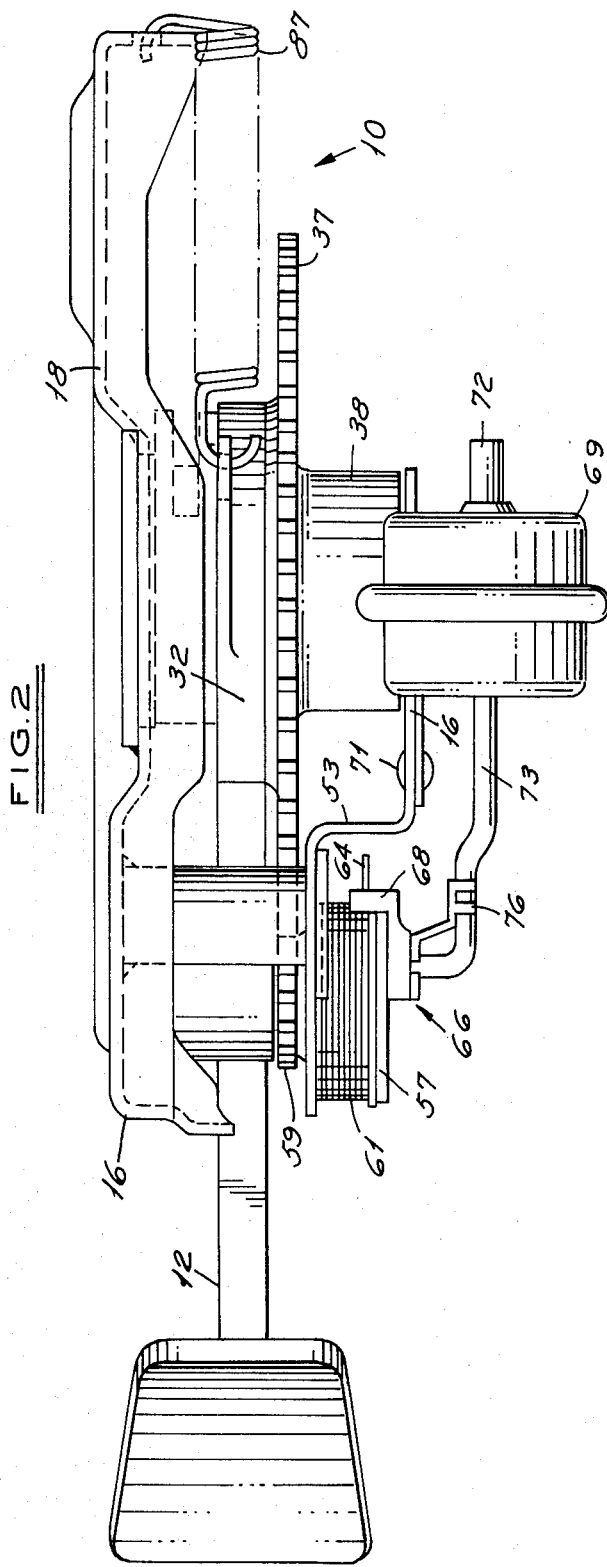
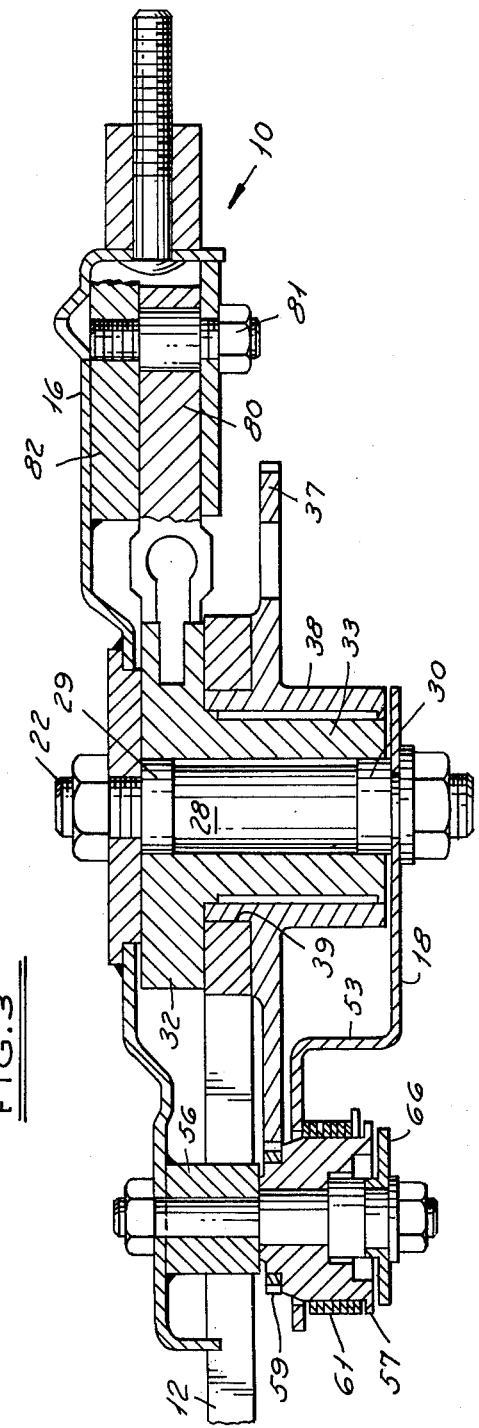

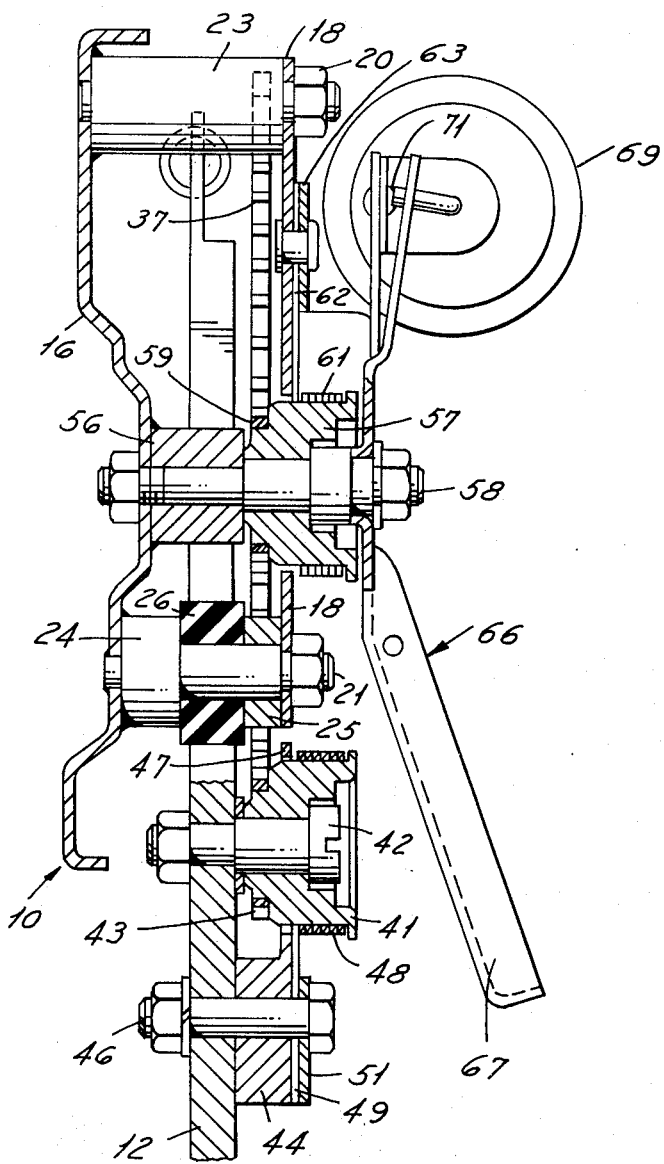

MULTI-STROKE PARKING BRAKE CONTROL

BACKGROUND AND SUMMARY OF THE DISCLOSURE

Foot operated parking brake controls for motor vehicles are well known. Conventionally, these devices provide a brake pedal that is secured to the end of a brake cable. The pedal is arranged to tension the cable by pivotal movement. A holding device, such as a pawl and ratchet, holds the pedal and cable in a brake applied position. The holding device may be released so that the cable and brakes will be displaced at an at-rest position.

The present invention provides an improvement in parking brake controls for motor vehicle brake systems. In order to improve the tensioning capability of the parking brake control while maintaining a desired level of operator effort, a parking brake control having a pedal that may be stroked a plurality of times is provided. The control of this disclosure permits a desirable high mechanical advantage ratio so that the parking brake cable may be properly tensioned while permitting operator effort at the brake pedal to be within acceptable limits.

In its presently preferred embodiment, this invention provides a parking brake control that includes a rotatably supported pulley which is connected to a brake cable. A large gear is affixed to the pulley. A pivotally supported brake pedal carries a rotatably mounted driving pinion in mesh with the large gear of the pulley. A one-way helical spring clutch interconnects the pedal and the driving pinion. The spring clutch is constructed (1) to hold the pinion fast with the pedal when the pedal is moving in a direction that tensions the brake cable and (2) to permit rotation of the pinion when the pedal is moving toward its retracted position.

A holding pinion is rotatably supported on the housing and is in mesh with the large gear. A one-way helical spring clutch interconnects the holding pinion and the housing. The spring clutch is constructed (1) to permit unrestricted rotation of the holding pinion with respect to the housing when the large gear and pedal are moving in a direction to apply the brakes and (2) to hold the holding pinion and large gear in a brake applied position when the vehicle operator releases the pedal.

A release mechanism is provided in association with the second spring clutch to permit the large gear, brake cable and pulley to return to the released position under the force of a return spring when the release mechanism disengages the second clutch from the holding pinion.

The preferred construction provides a parking brake control in which the pedal may be stroked a plurality of times by a vehicle operator until the parking brake cable is tensioned to a desired level.

BRIEF DESCRIPTION OF THE DRAWINGS

The many objects and advantages of a multi-stroke parking brake control for a motor vehicle that is constructed in accordance with this invention will become apparent upon consideration of the following detailed discussion and the accompanying drawings, in which:

FIG. 2 is a top plan view of the parking brake control of FIG. 1 viewed in the direction of arrows 2—2;

FIG. 3 is a sectional taken along section line 3—3 of FIG. 1; and

FIG. 4 is a sectional view taken along section line 4—4 of FIG. 1.

DETAILED DESCRIPTION OF A PREFERRED EMBODIMENT

Figure 1:
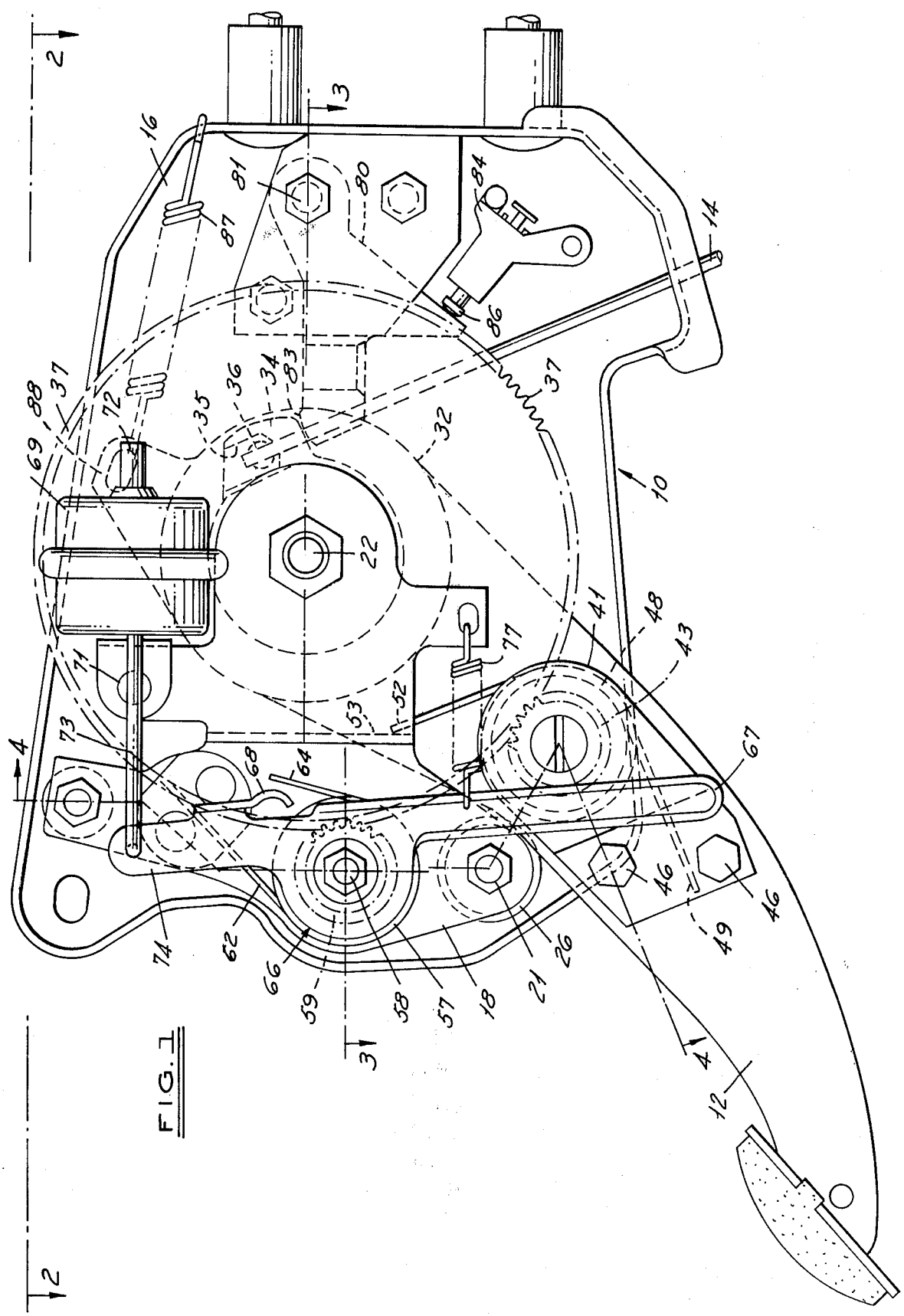
FIG. 1 is a side elevational view of the presently preferred embodiment of a new parking brake control.

Referring now to the drawings, wherein the presently preferred form of this invention is illustrated, FIG. 1 discloses a multi-stroke parking brake control 10 for a motor vehicle brake system. The parking brake control 10 is designed to be installed in the passenger compartment of a motor vehicle with its brake pedal 12 situated where it may be depressed by a vehicle operator to tension a brake cable 14.

The parking brake control 10 includes a large stamped metal housing 16 and a small housing 18 also of stamped construction. The housing part 18 is secured to housing part 16 by three bolts 20, 21 and 22 that pass through tubular spaces to maintain the housing parts 16 and 18 in spaced relationship. The bolt 20 extends through a tubular member 23 that is welded to the housing part 16. The bolt 21 extends through three annular spacers 24, 25 and 26. Spacer 26 is formed of rubber and functions as a stop for the pedal 12 when it is in its retracted position. A tubular spacer 28 having bushings 29 and 30 at each of its ends surrounds the bolt 22 and maintains the housing parts 16 and 18 in spaced relationship.

A pulley 32 has a tubular hub portion 33 that is rotatably supported on the bushings 29 and 30. The pulley 32 is provided with a radially extending portion 34 in which a recess 35 is formed. A ball 36 swaged onto the end of the brake cable 14 is seated in the recess 35.

A relatively large gear 37 has a tubular hub portion 38 that is affixed to the hub 33 of the pulley 32 so that the gear 37 will rotate with the pulley 32.

The brake pedal 12 has a central aperture 39 that is rotatably supported on the tubular hub 38 of the gear 37. The pedal 12 is arranged to be angularly displaced by the motor vehicle operator. It is movable from an at-rest or retracted position (as seen in FIG. 1) in a counterclockwise direction to a cable tensioning position.

Driving means supported on the brake pedal 12 is provided for rotating the gear 37 and pulley 32 when the pedal 12 is angularly displaced. Referring to FIGS. 1 and 4, a cup-shape drum 41 is rotatably supported by a bolt 42 on the pedal 12. A driving pinion gear 43 is welded to the drum 41 and is in mesh with the large gear 37. A bracket 44 supported on the pedal 12 by a bolt 46 has a platform portion 47 with a large aperture surrounding the drum 41. A helical spring coil 48 that functions as a one-way clutch surrounds the drum 41 and is supported on the bracket 44. The spring clutch 48 comprises a series of close convolutions snugly fitted on the exterior diameter of the drum 21. Projecting end 49 of the coil 48 is anchored to the brake pedal 12 by a plate 51 which, in turn, is secured to the braket 44 by the bolts 46. The other end 52 of the coil 48 engages a shoulder 53 formed on the housing part 18 when the brake pedal 12 is in its retracted position.

The coil 48 is snugly wound around the drum 41 in a direction so that when the drum rotates in a counterclockwise direction (as seen in FIG. 1) friction will cause the coil 48 to wrap around and grip the drum. Because the end 49 of the coil 48 is anchored on the pedal 12, the drum 41 and the driving pinion 43 will be fast with the pedal 12 in response to forces tending to rotate the driving pinion 43 in a counterclockwise direction. However, when the end 52 of the coil 48 is in engagement with the shoulder 53, the internal diameter of the coil will be increased so that the drum 41 will be free to slip with respect to the coil 48. The wrapping and gripping of the drum 41 by the coil 48 will not occur.

When the driving pinion 43 and drum 41 are rotated in a clockwise direction, the coil 48 will tend to unwind in response to any frictional engagement between these parts. The drum 41 will, therefore, be free to slip with respect to the coil 48. As a result, the one-way helical spring clutch 48 will not inhibit clockwise rotation of the driving pinion 43 and drum 41 with respect to the pedal 12.

Means are provided for holding the gear 37, pulley 32 and cable 14 in a brake applied or cable tensioning position. A cylindrical support member 56 is welded to the housing part 16. A cup-shape drum 57 is disposed adjacent the member 56 and is rotatably supported by a bolt 58. A holding pinion gear 59 is welded to the drum 57 and is arranged in mesh engagement with the large gear 37. A wire coil 61 is closely wrapped around the drum 57 and functions as a one-way spring clutch. One end of the coil 61 is anchored to the housing part 18 by a plate 63 that is riveted to the housing. The other end 64 of the coil 61 is unrestrained.

The coil spring 61 operates in a manner similar to the function of the coil 48. It is wound in a direction so that the holding pinion 59 and drum 57 are free to rotate in a clockwise direction (as seen in FIG. 1). A force urging the drum 57 is a counterclockwise direction will cause the coil 61 to wrap around and grip the drum. Because the end 62 of the coil 61 is anchored to the housing 18, the drum 57 and holdng pinion 59 wil be restrained against countercklockwise movement.

A release lever 66 is pivotally supported on the bolt 58. It has a depending handle portion 67 that may be gripped by the vehicle operator. An abutment 68 on the release lever 66 is juxtaposed the free end 64 of the coil 61.

A vacuum servo motor 69 is secured by a rivet 71 to the housing 18. The vacuum motor 69 has an inlet port 72 that is connected by means of a control switch to a source of vacuum such as an engine manifold. The servo motor 69 contains a diaphragm piston that is connected by a pushrod 73 to an upstanding portion 74 of the lever 66. A spring metal clip 76 retains the bent end of the pushrod 73 in engagement with the portion 74 of the lever 66.

A spring 77 is interposed between the housing part 18 and the lever 66 to urge the lever 66 counterclockwise with its abutment 68 spaced apart from the free end 64 of the spring coil 61. The abutment 68 may be brought into engagement with the end 64 of the coil 61 by pivotal movement of the lever 66 and the lever 66, in turn, may be displaced mutually by the vehicle operator or by actuation of the vacuum servo motor 69.

A stop member 80 is pivotally supported by a bolt 81 on a bracket member 82 that is welded to the housing part 16. The stop member 80 has an abutment 83 that is arranged to engage the radially extending portion 34 of the pulley 32. A normally closed electrical switch 84 is mounted on the housing 16 has a plunger 86 that engages a portion of the stop member 80.

The switch 84 is arranged to be placed in an electrical circuit that includes a warning light situated on the instrument panel of a motor vehicle to indicate to the vehicle operator that the parking brakes have been applied.

OPERATION

FIG. 1 illustrates the parking brake 10 in a brake released portion. The brake pedal 12 is urged in a clockwise direction by the coil spring 87 which is interposed between the housing part 16 and an upwardly extending portion 88 of the pedal. In its retracted position, the pedal 12 engages the member 26 which functions as a stop. Tension in the brake cable 14 rotates the pulley 34 and gear 37 in a clockwise direction until the upstanding portion 34 engages the abutment 83 of the stop member 80. The stop member 80 engages the plunger 86 of the switch 84 and, under the force exerted by the tension in cable 14, the plunger 86 is moved inwardly. The switch 84 is of the normally closed variety whereby inward movement of the plunger 86 opens the contacts of the switch 84 and provides an open circuit for the parking brake warning light.

When the pedal 12 is in its retracted position, the free end 52 of the coil 48 engages the shoulder 53 of the housing 18 whereby the internal diameter of the coil 48 is slightly increased. With the coil 48 expanded, the drum 41 and driving pinion 43 are free to rotate in a counterclockwise direction when the gear 37 is urged in a clockwise direction by tension in the cable 14. In addition, the holding pinion 59 and drum 57 are normally free to rotate in a counterclockwise direction relative to the clutch coil 61. Therefore, clockwise rotation of the gear 37 is not inhibited by the holding pinion 59 and its associated parts.

When it is desired to apply the parking brakes, the vehicle operator exerts a force upon the brake pedal 12 causing it to move in a counterclockwise direction about the axis of the pivot bolt 22. Upon initial displacement of the pedal 12 the free end 52 of the coil 48 will be moved away from the shoulder 53 and the coil will be free to grip the drum 41. The movement of the pedal 12 will tend to cause the driving pinion 43 and drum 41 to rotate in a counterclockwise direction. Counterclockwise movement of the drum 41 relative to the pedal 12 will be immediately prevented by the coil 48 which functions as a one-way clutch. Nominal counterclockwise movement of the drum 41 will cause the coil 48 to wrap itself tightly about and grip the drum.

Because the end 49 of the coil 48 is anchored to the pedal 12, when the pedal is pivoted counterclockwise the driving pinion 43 will become fast with the pedal and will form a driving connection between the pedal and the gear 37. Therefore, movement of the brake pedal 12 from its retracted position will cause the gear 37 to move in a counterclockwise direction. The pulley 32, being secured to the gear 37, will also be driven counterclockwise and this movement will impose a tensile load on the brake cable 14.

The driving gear 37 in a counterclockwise direction by movement of the pedal 12 will not be inhibited by the holding pinion 59. Counterclockwise rotation of the holding pinion 59 and the drum 57 is in a direction that tends to unwind the coil 61 and, therefore, the coil will not grip the drum.

After the pedal 12 has been displaced causing tensioning of the cable 14, a release of pressure on the pedal will permit the pedal to return to its FIG. 1 position under the force of the spring 87. The gear 37 will tend to rotate clockwise under the force of the tension in cable 14 and drive the holding pinion 59 in a counterclockwise direction. Such movement, however, will be prevented by the coil 61. Nominal rotation of the drum 57 in a counterclockwise direction will cause the coil 61 to wrap itself tightly about the drum and to prevent its further rotation. Thus, the holding pinion 59, in association with the drum 57 and coil 61, functions as a holding device to hold the gear 37, the pulley 32 and the cable 14 in a brake applied position.

The pedal 12 is free to return to its retracted position under the force of coil spring 87 when the vehicle operator ceases to apply a force to it. The driving pinion 43 and the drum 41 are free to rotate clockwise with respect to the clutch coil 48 when the pedal 12 swings from a forward position to a retracted position.

If it is desired to increase the tension in the cable 14, the pedal 12 may be stroked a second or third time, if desired. With each additional stroke the pulley 32 will be further rotated and the cable 14 will be wrapped around the pulley. During each application of force to the pedal 12, the driving pinion gear 43 will be held fast with the pedal 12 to form a driving connection between the pedal and the gear 37. When the force is released from the pedal 12, the holding pinion 57 will function as a holding device to secure the gear 37 and the parts connected thereto including the cable 14 in a brake applied position.

When the pulley 32 is first displaced by the pedal 12 it will be moved out of engagement when the abutment 83 of the stop member 80. This movement will permit the plunger 86 of the switch 84 to be extended whereby the contacts within the switch will be closed. This will complete the electrical circuit and the parking brake warning light on the instrument panel will be illuminated. The vehicle operator will thus be informed of the fact that the parking brake have been applied.

When it is desired to release the vehicle's parking brake, the lever 66 is rotated in a clockwise direction until the abutment 68 engages the free end 64 of the clutch coil 61. The lever 66 may be rotated manually by the vehicle operator or automatically by the application of vacuum to the servo motor 69.

When the abutment 68 of lever 66 engages the free end 64 of the clutch coil 61, the coil will be expanded and thereby release its gripping engagement with the drum 57. The holding pinion 59 will then be free to rotate in a counterclockwise direction as well as clockwise. The tension in the brake cable 14 will cause the pulley 32 and the gear 37 to rotate clockwise until the pulley portion 34 engages the abutment 83 of the stop lever 80. The lever 80 will be displaced slightly causing the plunger 86 to open the contacts in the switch 84. The parking brake warning light will be turned off and the parking brake will be in a released condition.

In summary, the preferred embodiment of the present invention includes a parking brake control in which the parking brake pedal may be stroked a plurality of times for the purpose of assuring adequate tensioning of the parking brake cable. The mechanism includes a pair of pinions, one of which functions as a driving pinion and forms part of the mechanical connection between the brake pedal and brake cable. The other pinion functions as a holding device and is supported on the housing. Each pinion has associated therewith a one-way helical spring clutch. One of the spring clutches holds the driving pinion fast with the brake pedal when the pedal is being stroked during a brake application. The other spring clutch holds the holding pinion fast with the housing when the parking brake cable is set in a brake applied position.

The foregoing description presents the presently preferred embodiment of this invention. Modifications and alterations may occur to those skilled in the art that will come within the scope and spirit of the following claims:

I claim:
1. A multi-stroke parking brake control having rotatably mounted means engaging a parking brake cable and constructed to impose a tensile load on said cable when said means is angularly displaced;
   said means including gear teeth formed along an arc of a circle;
   a brake pedal constructed to pivot about the axis of rotation of said means from a retracted position to a cable tensioning position by the application of a force thereto;
   a driving pinion rotatably supported on said pedal and engaging said gear teeth;
   a first one-way clutch operatively interposed between said driving pinion and said pedal;
   said first one-way clutch being constructed to hold said driving pinion rotatably fast with respect to said pedal when said pedal is displaced from said retracted position to said cable tensioning position;
   said first one-way clutch being constructed to not inhibit rotation of said driving pinion about its axis when said pedal is displaced from said cable tensioning position to said retracted position;
   said first one-way clutch comprising a first drum shape element coupled to said driving pinion and a first helical spring coil disposed about said first drum shape element;
   said first coil having one end secured to said pedal;
   said first coil being constructed to grip said first drum element when said first drum element is rotated in one direction and to slidably engage said first drum element when said first drum element is rotated in the opposite direction;
   a housing part and a holding pinion rotatably supported on said housing part;
   said holding pinion being in mesh engagement with said gear teeth;
   a second one-way clutch operatively interposed between said housing part and said holding pinion;
   said second one-way clutch being constructed to hold said holding pinion fast with respect to said part in response to a tensile load in said cable;
   said second one-way clutch being constructed to not inhibit rotation of said holding pinion when said means is angularly displaced in a direction tending to impose a tensile load on said cable;
   said second one-way clutch including a second drum shape element coupled to said holding pinion and a second helical spring coil disposed about said second drum shape element;
   said second coil having one end secured to said housing;
   said second coil being constructed to grip said second drum shape element when said second drum shape element is rotated in one direction and to slidably engage said second drum shape element when said second drum shape element is rotated in the opposite direction;
   release means engageable with said second one-way clutch and constructed to disengage said second clutch from said holding pinion to permit said holding pinion to rotate freely in either direction;

said second coil having a free end;

said release means having a portion constructed to engage the free end of said second coil and to displace said second coil whereby said second drum shape element slideably engages said second coil when said second shape drum element is rotated in said one direction;

a retractor spring constructed to move said pedal from said cable tensioning position to said retracted position when said force is not applied to said pedal;

said first coil having a free end constructed to engage said housing part when said pedal is in said retracted position;

said first drum element being slidable with respect to said first coil when rotated in said one direction when said free end of said first coil is in engagement with said housing part.

* * * * *